United States Patent
Chung et al.

(10) Patent No.: US 10,954,468 B2
(45) Date of Patent: Mar. 23, 2021

(54) METHOD FOR REGENERATION OF USED LUBRICATING OILS

(71) Applicant: Qingdao Institute of Bioenergy and Bioprocess Technology, Chinese Academy of Sciences, Shandong (CN)

(72) Inventors: Keng H. Chung, Shandong (CN); Xuebing Li, Shandong (CN); Song Chen, Shandong (CN); Guangci Li, Shandong (CN); Bin Chen, Shandong (CN)

(73) Assignee: Qingdao Institute of Bioenergy and Bioprocess Technology, Chinese Academy of Sciences, Shandong (CN)

( * ) Notice: Subject to any disclaimer, the term of this patent is extended or adjusted under 35 U.S.C. 154(b) by 33 days.

(21) Appl. No.: 16/162,111

(22) Filed: Oct. 16, 2018

(65) Prior Publication Data
US 2019/0119605 A1   Apr. 25, 2019

(30) Foreign Application Priority Data
Oct. 20, 2017  (CN) .......................... 201710983003.5

(51) Int. Cl.
| | |
|---|---|
| *C10M 175/00* | (2006.01) |
| *B01J 23/28* | (2006.01) |
| *B01J 23/30* | (2006.01) |
| *B01J 23/06* | (2006.01) |
| *B01J 23/745* | (2006.01) |
| *B01J 23/75* | (2006.01) |
| *B01J 23/755* | (2006.01) |
| *B01J 29/06* | (2006.01) |
| *B01J 21/08* | (2006.01) |
| *B01J 21/04* | (2006.01) |
| *C10M 175/02* | (2006.01) |
| *C10N 30/20* | (2006.01) |
| *C10N 40/04* | (2006.01) |
| *C10N 40/08* | (2006.01) |
| *C10N 40/12* | (2006.01) |
| *C10N 40/25* | (2006.01) |
| *C10N 60/04* | (2006.01) |

(52) U.S. Cl.
CPC ........ *C10M 175/0008* (2013.01); *B01J 21/04* (2013.01); *B01J 21/08* (2013.01); *B01J 23/06* (2013.01); *B01J 23/28* (2013.01); *B01J 23/30* (2013.01); *B01J 23/745* (2013.01); *B01J 23/75* (2013.01); *B01J 23/755* (2013.01); *B01J 29/06* (2013.01); *C10M 175/0016* (2013.01); *C10M 175/0033* (2013.01); *C10M 175/02* (2013.01); *B01D 2251/104* (2013.01); *B01D 2251/106* (2013.01); *B01J 2523/69* (2013.01); *B01J 2523/842* (2013.01); *B01J 2523/845* (2013.01); *B01J 2523/847* (2013.01); *C10N 2030/20* (2013.01); *C10N 2040/04* (2013.01); *C10N 2040/08* (2013.01); *C10N 2040/12* (2013.01); *C10N 2040/25* (2013.01); *C10N 2060/04* (2013.01)

(58) Field of Classification Search
CPC combination set(s) only.
See application file for complete search history.

(56) References Cited

U.S. PATENT DOCUMENTS

| | | | |
|---|---|---|---|
| 3,919,076 A | 11/1975 | Cutler et al. | |
| 3,930,988 A | 1/1976 | Johnson | |
| 3,980,551 A | 9/1976 | Wolk | |
| 4,502,948 A | 3/1985 | Tabler | |
| 2011/0079540 A1* | 4/2011 | Krishna | B01J 21/04 208/58 |
| 2013/0206606 A1* | 8/2013 | Gilliam | C25B 11/0442 205/351 |

FOREIGN PATENT DOCUMENTS

| | | | | |
|---|---|---|---|---|
| CN | 104395434 A | * | 1/2015 | .......... B01J 2231/70 |
| EP | 3078730 A | | 10/2016 | |
| WO | WO-2016154529 A1 | * | 9/2016 | .......... C10G 25/003 |

* cited by examiner

*Primary Examiner* — Ellen M Mcavoy
*Assistant Examiner* — Chantel L Graham
(74) *Attorney, Agent, or Firm* — Novick, Kim & Lee, PLLC; Allen Xue

(57) ABSTRACT

A method for the regeneration of used lubricating oils to produce lubricant base oils includes the steps of (a) removing resin and impurities by distillation, (b) catalytic oxidation treatment and (c) adsorption process. The method can efficiently reduce the color, metal ions, and sulfur content under mild reaction conditions at low cost and obtain high yield of regenerated oil above 85 wt. %.

14 Claims, No Drawings

METHOD FOR REGENERATION OF USED LUBRICATING OILS

FIELD OF THE INVENTION

The invention relates to a method for the regeneration of used lubricating oils to produce lubricant base oils, particularly for the regeneration of used engine lubricating oils from automobile engines, marine engines, and aviation engines.

BACKGROUND OF THE INVENTION

Used lubricating oils, which are discarded after having been used in engines or other machines, consist of lubricant bases and additives and their decomposed by-products. In addition, they may contain contaminants, such as metal ions, water, and solvents, which are acquired during their utilization and collection. In the past, used lubricating oils were commonly disposed by combustion and landfill. Due to increased stringent environmental regulations, many jurisdictions now prohibit combustion and landfill of used lubricating oils. Since most components of used lubricating oils are valuable chemicals, various methods for recovering lube base oil from used lubricating oils have been developed.

A method commonly used to treat used lubricating oils is to add sulfuric acid to the used lubricating oils. Sulfuric acid interacts with contaminants in the used lubricating oils, resulting in separation of most contaminants and decomposition by-products from the used lubricating oils. After the acid treatment, a clay adsorption is often used to further purify and remove remaining contaminants (U.S. Pat. No. 4,502,948). Although this is a relatively simple and low-cost method for treating used lubricating oils, the wastes (acid sludge and contaminated clay) generated from the process are difficult and expensive to treat. As a result, the acid treatment method is prohibited by many jurisdictions.

Another commonly used method for treating used lubricating oils is to use a combination of flashing, evaporation, and distillation, in which water, light decomposed hydrocarbons, and lube oil base stock can be fractionated and removed from heavy impurities (E.P. Patent No. 3,078,730A1). The obtained lube oil base stock can be subjected to catalytic hydroprocessing to yield a lube oil base stock with quality similar to virgin lube oil (see U.S. Pat. No. 3,980,511). Nevertheless, hydroprocessing is a relatively high cost process. The removal of contaminants, such heteroatom compounds containing sulfur, nitrogen, and oxygen, by adsorption process was developed (U.S. Pat. No. 3,930,988).

Extraction process is also used to treat used lubricating oils, in which a light, saturated hydrocarbon solvent is mixed with used lubricating oils to separate the lube oil base stock from impurities, such as high molecular weight additives, additive fragments, and oxidized oil products (U.S. Pat. No. 3,919,076). However, the extraction process has limited applications due to its high energy utilization for solvent recovery.

The above summarizes the used lubricating oil treatment methods commonly known to the persons skilled in the art. Nevertheless, in view of increasing stringent environmental regulatory requirements, there is still a need for developing a more efficient and cost-effective treatment method for used lubricating oils.

SUMMARY OF THE INVENTION

The present invention relates to a method, which is to produce lube base oil from used lubricating oil, such as used engine lube oil and used gear lube oil. The method comprises three processes: distillation, catalytic oxidation, and adsorption. The catalytic oxidation process is conducted by contacting used lubricating oil with ozone in the presence of a supported oxidizing catalyst comprising at least one transition metal and molecule sieve/zeolite. The adsorption process is conducted by contacting the oxidized oil with an adsorbent containing $SiO_2$ and/or $Al_2O_3$.

DETAILED DESCRIPTION OF THE INVENTION

The method mentioned in the invention is particularly for producing lube base oil from used lubricating oil. To maximize the proportion of the said product, three processes will be employed successively. The first one is the distillation process of used lubricating oil to remove the lube oil fraction from water, heavy decomposed products, and other impurities. The second one is the catalytic oxidation process of the separated lube oil fraction with ozone in the presence of a catalyst, which converts oil-soluble nonpolar impurities to polar substances. The third one is the adsorption process of oxidized lube oil fraction in the presence of an absorbent to remove the polar substances, resulting in regenerated lube base oil.

Distillation process is conducted at a relatively low temperature under vacuum to obtain high yield of lube base oil fraction. It is known that high distillation temperatures under air atmosphere can generate heavy decomposed oil products. Catalytic oxidation process is conducted at ambient temperature to reduce the loss of lube base oil due to oxidation. During catalytic oxidation, only soluble impurities containing heteroatoms (N, S, Cl) are transformed from nonpolar to polar type substances, such as from thiophene to sulfone and/or sulfoxide. The resulting polar substances are removed by adsorption with oxide adsorbent, which produces a final oil product with quality similar to the virgin lube base oil.

The involved catalyst has abundant oxidation active sites that can catalytically dissociate ozone to active oxygen atoms. These active sites may originate from the same or different active component provided from transition metal oxide, including but not limited to iron, cobalt, nickel, copper, tungsten, and molybdenum, and their mixtures. These active metals are used in the form of metal oxide within oxidation reactions. To increase active metal exposure and utilization, the oxide with high specific surface area is used as support, such as molecule sieve/zeolite or the materials containing molecule sieve/zeolite. In addition to the surface area, the surface acidic sites of those materials can improve the dispersion of active metals due to the interaction between metal and support. Since the lube oil molecules have a relatively large molecular sizes, supports with large pore size (mesopore or macropore) are need. Examples of zeolite materials containing 10-12 member-rings such as BEA, MOR, MFI, or FAU, are used as composition of supports.

Feedstocks

The feedstocks are used lubricating oils, such as used engine oil, used gear lube oil, used hydraulic oil, used turbine oil, used heating oil, used mineral oil, waste biomass oil, and their mixtures. Suitable feedstocks are used engine oil and gear lube oil, containing paraffins, iso-paraffins, and cycloalkanes. The preferred feedstocks are, but not limited to, engine oils from various automobiles, motorcycles, airplanes, ships, and their mixtures.

Reaction Conditions

The method according to the invention comprises distillation, catalytic oxidation, and adsorption processes. In order to increase the yield of lube base oil fraction, the distillation process is carried out at a temperature of 150-300° C. under vacuum, preferably 150-250° C. To reduce secondary oxidized impurities from lube base oil fraction, the catalytic oxidation and adsorption processes are carried out at ambient temperature.

The catalytic oxidation process may be carried out in batch, semi-batch or continuous reaction system; in reactor such as continuous stirred tank reactor or fixed-bed reactor, followed by the separation of the desired oil fraction products.

In another embodiment, the used lubricating oil contains a small amount of resins and/or heavy composition and it is preferred to be treated by the catalytic oxidation process, followed by the adsorption process to remove impurities.

In another embodiment, the used lubricating oil may be treated by the distillation process subsequent to the catalytic oxidation process, and followed by the adsorption process.

The following examples with some preferable embodiments are presented in illustration of the invention. However, it is evident to persons skilled in the art that the scope of the invention is not meant to be limited to these examples.

EXAMPLE

Initially, 20 L of the raw used engine oil was introduced into a separation vessel to remove small amount of free water by gravity settlement, followed by physical filtration to remove suspended impurities. The treated oil was transferred to a distillation device to separate lube base oil fraction. The distillation process was carried out at 200° C. and 0.095 MPa, and the fraction with the boiling point range of 170-190° C. was collected. The properties of the obtained lube oil fraction were listed in the following table.

| Property | Value | Test Method |
| --- | --- | --- |
| Appearance | Dark brown | |
| Color | 4.7 | ASTM D1500 |
| Flash point by open cup, ° C. | 278 | ASTM D92 |
| Kinematic viscosity/(mm$^2$/s) | | |
| 100° C. | 10.6 | ASTM D445 |
| 40° C. | 27.2 | |
| Pour point, ° C. | −40 | ASTM D97 |
| Density at 20° C., g/cm$^3$ | 0.835 | ISO 3675 |
| Total acid number, mgKOH/g | 3.2 | ASTM D664 |
| Water-Karl Fischer, mg/kg | 350 | ASTM D6304 |
| Sulfur, mg/kg | 1290 | ASTM D4294 |
| Metals (Fe, Ni, Co, Mo, W), mg/kg | 25 | ASTM D7359 |

Catalytic oxidation of the above lube base oil fraction was carried out in a stirred batch reactor over a supported oxidation catalyst at ambient temperature. Ten liters of oil was added into a reactor, followed by adding 50 L of water which was used as diluent and transfer agent of activated oxygen. A screened basket packed with 50 g of catalyst was inserted into the reactor. The reactor was sealed, and pressure tested with nitrogen. A mixture of oxygen and ozone, produced by an ozone generator system, was injected into the low section of reactor at a flow rate of 2 L/min, where the concentration of ozone was 7.0 vol. %. The reaction was performed at ambient temperature (c.a. 20° C.) for 3 h at 600 rpm stirring rate. After the oxidation reaction, the reaction oil product was collected and subjected to centrifugation to remove water, floccule, and resin generated by oxidation reactions. The yield of desired oil product obtained was 97.9 wt. %. The properties of the oxidized oil product were listed in the following table.

| Property | Value | Test Method |
| --- | --- | --- |
| Appearance | Clear | |
| Color | <0.5 | ASTM D1500 |
| Flash point by open cup, ° C. | 270 | ASTM D92 |
| Kinematic viscosity, mm$^2$/s | | |
| 100° C. | 11.8 | ASTM D445 |
| 40° C. | 29.3 | |
| Pour point, ° C. | −44 | ASTM D97 |
| Density at 20° C., g/cm$^3$ | 0.837 | ISO 3675 |
| Total acid number, mgKOH/g | 0.05 | ASTM D664 |
| Water-Karl Fischer, mg/kg | 180 | ASTM D6304 |
| Sulfur, mg/kg | 107 | ASTM D4294 |
| Metals (Fe, Ni, Co, Mo, W), mg/kg | Not detected | ASTM D7359 |

After catalytic oxidation, the oxidized oil was transferred into an adsorption column for further purification. The adsorption column was packed with 100 g of 160-200 mesh adsorbent materials, consisting of $SiO_2$ and $Al_2O_3$. The oxidized oil was fed to the top section of the adsorption column at a flow rate of 100 mL/h at ambient condition. The purified lube base oil was collected at the bottom of adsorption column. The properties of the regenerated lube base oil were listed in the following table.

| Property | Value | Test Method |
| --- | --- | --- |
| Appearance | Clear | |
| Color | <0.5 | ASTM D1500 |
| Flash point by open cup, ° C. | 270 | ASTM D92 |
| Kinematic viscosity, mm$^2$/s | | |
| 100° C. | 11.7 | ASTM D445 |
| 40° C. | 29.3 | |
| Pour point, ° C. | −44 | ASTM D97 |
| Density at 20° C., g/cm$^3$ | 0.836 | ISO 3675 |
| Total acid number, mgKOH/g | 0.05 | ASTM D664 |
| Water-Karl Fischer, mg/kg | 70 | ASTM D6304 |
| Sulfur, mg/kg | 7 | ASTM D4294 |
| Metals (Fe, Ni, Co, Mo, W), mg/kg | Not detected | ASTM D7359 |

We claim:

1. A method for regenerating a used lubricating oil, comprising:
    subjecting the used lubricating oil to vacuum distillation to obtain a lube base oil;
    adding the lube base oil, water, an oxidizing agent, and a catalyst in a reactor, wherein the lube base oil is catalytically oxidized to form a reaction mixture containing an oxidized oil product;
    separating the oxidized oil from the reaction mixture; and
    passing the oxidized oil through an adsorption column to obtain a purified lubricating oil.

2. The method according to claim 1, wherein the catalytic oxidation and the adsorption step are carried out at a temperature of 0-100° C.

3. The method according to claim 1, wherein the oxidizing agent is a gas oxidizing agent, a liquid oxidizing agent, or a combination thereof.

4. The method according to claim 1, wherein the used lubricating oil is used engine lube oil, used gear lube oil, used hydraulic oil, used turbine oil, used heating oil, used mineral oil, or waste biomass oil.

5. The method according to claim 2, wherein the oxidizing agent is oxygen, ozone, or hydrogen peroxide.

6. The method according to claim 1, wherein the catalyst is a supported multifunctional catalyst comprising one or more transition metals selected from molybdenum, tungsten, cobalt, nickel, iron, and zinc and a support selected from inorganic oxides and molecule sieve/zeolite materials.

7. The method according to claim 1, wherein the lube base oil is catalytically oxidized for 0.5 to 24 h.

8. The method according to claim 1, wherein the adsorption column contains a packed adsorbent that is $Al_2O_3$, $SiO_2$, or aluminosilicate.

9. The method according to claim 1, wherein a residence time of the oxidized oil in the adsorption column is 0.5 to 2 h.

10. The method according to claim 2, wherein the catalytic oxidation and the adsorption step are carried out at ambient temperature.

11. The method according to claim 1, wherein the oxidized oil is separated from the reaction mixture by centrifiguration.

12. The method according to claim 1, wherein the oxidizing agent is oxygen.

13. The method according to claim 2, wherein the oxidizing agent is ozone.

14. The method according to claim 1, wherein a volume ratio of the lube base oil and the added water is 1:5.

* * * * *